United States Patent
Kramskoy (10) Patent No.: US 6,976,254 B2
(45) Date of Patent: Dec. 13, 2005

(54) INTER-METHOD CONTROL TRANSFER FOR EXECUTION ENGINES WITH MEMORY CONSTRAINTS

(75) Inventor: Jeremy Paul Kramskoy, Long Ditton (GB)

(73) Assignee: Esmertec AG, Dubendorf (CH)

(*) Notice: Subject to any disclaimer, the term of this patent is extended or adjusted under 35 U.S.C. 154(b) by 509 days.

(21) Appl. No.: 09/996,169

(22) Filed: Nov. 28, 2001

(65) Prior Publication Data
US 2003/0110200 A1 Jun. 12, 2003

(51) Int. Cl.[7] .............................................. G06F 9/455
(52) U.S. Cl. ................................ 718/1; 711/6; 717/118
(58) Field of Search ............................. 718/1; 717/126, 717/139, 140, 145, 118; 711/202, 1, 6, 200; 712/202

(56) References Cited

U.S. PATENT DOCUMENTS

| | | |
|---|---|---|
| 4,675,829 A | 6/1987 | Clemenson |
| 4,924,408 A | 5/1990 | Highland |
| 5,210,876 A | 5/1993 | Uchida |
| 5,301,260 A | 4/1994 | Miyashita |
| 5,301,325 A | 4/1994 | Benson |
| 5,339,436 A | 8/1994 | Tairaku et al. |
| 5,367,685 A | 11/1994 | Gosling |
| 5,442,792 A | 8/1995 | Chun |
| 5,450,575 A | 9/1995 | Sites |
| 5,452,457 A | 9/1995 | Alpert et al. |
| 5,469,574 A | 11/1995 | Chang et al. |
| 5,530,964 A | 6/1996 | Alpert et al. |
| 5,551,040 A | 8/1996 | Blewett |
| 5,590,332 A | 12/1996 | Baker |
| 5,598,561 A | 1/1997 | Funaki |
| 5,603,030 A | 2/1997 | Gray et al. |
| 5,613,120 A | 3/1997 | Palay et al. |
| 5,655,122 A | 8/1997 | Wu |
| 5,675,804 A | 10/1997 | Sidik et al. |
| 5,721,854 A | 2/1998 | Ebcioglu et al. |
| 5,727,178 A * | 3/1998 | Pletcher et al. ............. 711/202 |
| 5,761,513 A | 6/1998 | Yellin et al. |
| 5,764,989 A | 6/1998 | Gustafsson et al. |
| 5,815,720 A | 9/1998 | Buzbee |

(Continued)

FOREIGN PATENT DOCUMENTS

EP 0 604 010 A1 6/1994

(Continued)

OTHER PUBLICATIONS

Vijaykrishnan et al. "supporting object accesses in Java processor" IEEE 2000, pp. 435-443.*

*Primary Examiner*—Meng-Al T. An
*Assistant Examiner*—Van Hoa Nguyen
(74) *Attorney, Agent, or Firm*—Caesar, Rivise, Bernstein, Cohen & Pokotilow, Ltd.

(57) ABSTRACT

A bytecode execution system and method for increasing the execution speed of invoking and returning from Methods while minimizing the memory footprint required to support this. The system includes a virtual machine with a class loader and an interpreter or, alternatively, a hardware accelerator. Speed and memory enhancements are realized by establishing an activation stack frame template with a set of criteria. Each Method from subject code is examined to determine whether the Method conforms to the criteria of the stack frame template. If the Method conforms, an activation frame for that Method based on the activation stack frame template is created when the Method is invoked. Otherwise, an activation frame based on standard virtual machine criteria is created. An access structure is associated with each Method and a Method routing structure is created for each class.

20 Claims, 5 Drawing Sheets

U.S. PATENT DOCUMENTS

| | | | |
|---|---|---|---|
| 5,835,771 A | 11/1998 | Veldhuizen | |
| 5,848,274 A | 12/1998 | Hamby et al. | |
| 5,857,104 A | 1/1999 | Natarjan et al. | |
| 5,872,978 A | 2/1999 | Hoskins | |
| 5,873,104 A | 2/1999 | Tremblay et al. | |
| 6,148,391 A * | 11/2000 | Petrick | 712/202 |
| 6,192,516 B1 * | 2/2001 | Griesemer | 717/139 |
| 6,477,702 B1 * | 11/2002 | Yellin et al. | 717/126 |
| 6,507,946 B2 * | 1/2003 | Alexander et al. | 717/145 |
| 6,631,515 B1 * | 10/2003 | Berstis | 717/140 |
| 6,654,778 B1 * | 11/2003 | Blandy et al. | 718/1 |

FOREIGN PATENT DOCUMENTS

| | | |
|---|---|---|
| EP | 0 810 522 A2 | 12/1997 |
| EP | 0 881 577 A2 | 12/1998 |
| EP | 0 913 769 A2 | 5/1999 |
| EP | 0 943 989 A2 | 9/1999 |

* cited by examiner

INTER-METHOD CONTROL TRANSFER FOR EXECUTION ENGINES WITH MEMORY CONSTRAINTS

BACKGROUND OF THE INVENTION

The present invention relates to software execution machines. More particularly, the invention relates to a method and a device to improve execution of method invocations and returns.

As is known, object oriented programming involves three major concepts: encapsulation, inheritance, and polymorphism. Classes are software modules and contain data (e.g., data members) and processing functions that manipulate that data (e.g., methods (hereinafter "Methods")). Encapsulation involves making the internal details of the data and Methods used inaccessible (by language access restrictions) to other classes and providing an official interface for accessing the class. Thus, some Methods and data are visible externally to the class, and others are hidden. Objects are instances of a class. Every object of the same class has exactly the same data layout, though the contents of the data may vary between objects. Methods can act on data defined or initialized within the object or they may also receive data through parameter passing. A Method is executed by using its name in a process often referred to as an invocation or invoke. Methods may provide result or output data using a return statement. Inheritance allows Methods and data in one class, that are part of the official interface to that class, to be automatically available to sub-classes without any need for the sub-class to define them further. The subclass is free to add its own features and also override inherited Methods with its own Methods to specialize that behavior for its own class. For example, a class "MultiMediaPlayer" may define a Method "Play" which is made part of its official interface. Another Method in this class invokes "Play," using a MultiMediaPlayer object. There may be two subclasses, a VideoPlayer class and an AudioPlayer class, that inherit "Play" from "MultiMediaPlayer" but choose to override it with their own Method, appropriately redefined to reflect the differences in video player and audio player playback. When an object of type VideoPlayer is used in MultiMediaPlayer's invoke on "Play," this results in VideoPlayer's "Play" Method receiving control. Similarly, when an object type AudioPlayer is used in MultiMediaPlayer's invoke on "Play," this results in AudioPlayer "Play" Method receiving control. The MultiMediaPlayer's invoke exhibits polymorphism, as different object shapes can be used with it (so long as they are correctly related by class hierarchy).

Java is one type of object-oriented language and is often implemented as an interpreted language. One feature of Java is that the overall process of executing Java source code involves a conversion of the Java source code into an intermediate form called bytecode. (This process may be carried out by a Java compiler). Bytecode is executed by an interpreter in a Java virtual machine. In simple terms, the Java virtual machine is so named because while it performs bytecode processor or machine functions (i.e., execution of bytecode instructions) it most commonly consists of software (often written in the C programming language) rather than hardware. Thus, it is a virtual implementation of a bytecode processor or machine. There are also Java hardware accelerators (actual hardware) capable of directly executing some of the bytecodes. Ultimately, an actual hardware processor or combination of hardware processor and Java hardware accelerator executes the virtual machine.

The semantics of bytecode are specified by the Java Virtual Machine ("JVM") specification (available from Sun Microsystems and other publishers). Bytecode was originally designed to execute on a stack-based abstraction of a computer processor, i.e., a virtual machine. As noted above, a virtual machine may be implemented through pure software, or a combination of software and hardware. When a Java virtual machine is implemented with software and hardware, the hardware component is referred to as a Java hardware accelerator. The accelerator can exist as a separate coprocessor, or as an extension to the core of existing processor architecture. However, Java Method invocations and returns are typically handled by software, regardless of the presence of a hardware accelerator. The complex semantics of invocations and returns may require several lines of C code, which in turn amounts to roughly 100–150 machine instructions for invokes and about 50–60 machine instructions for returns.

There is a growing demand for Java applications for devices (such as cell phones, PDA's, and the like) having relatively limited processing power, limited memory, or both. However, the limited capabilities of these devices make it difficult to execute all but the shortest and simplest Java programs. And, even where execution is possible, the speed of execution is often unacceptably slow.

SUMMARY OF THE INVENTION

Accordingly, there is a need for improved methods and devices for executing software programs on devices having limited capabilities, and particularly limited memory. The inventor has found that improved inter-Method control transfer methods and devices can reduce execution engine overhead and improve overall execution time of applications run on devices having limited capabilities.

In functional terms, invokes and returns require several basic processing steps. These steps include: 1) relinquishing control to the software (only when a Java hardware accelerator is used); 2) determination of destination address; 3) frame creation (and destruction); and 4) relinquishing control from the software (hardware accelerator only). The impact and importance of these steps is illustrated by the following example. Suppose a Java Method contains twenty bytecodes which include one invoke and one return. Suppose the bytecode execution engine is an optimized assembler interpreter, capable of implementing simple bytecodes in 3 to 4 CPU instructions, but falls back to C code to handle the invoke and return. Executing this Method consumes about 54 to 72 CPU cycles in the interpreter and about 200 CPU cycles within the C layer. Approximately 22%–26% of the cycles executed are attributed to the simple bytecodes. Using Java to model object-oriented techniques such as encapsulation and polymorphism can result in moderate percentages of invokes and returns being executed, which in turn scales up considerably in terms of CPU cycles executed. If an additional invoke is added to the Method, about 350 CPU cycles are consumed in the C layer. In this case, about 14% to 17% of the cycles executed are attributed to the simple bytecodes. With a Java hardware accelerator, these proportions are generally less, since the accelerator drives down the number of cycles taken to execute the simple bytecodes, while leaving the C layer consumption unchanged.

If the overhead for supporting invokes and returns is reduced to about 60 cycles in total, total execution cost can be reduced to about half the original cycle count in the above assembler-interpreter example. That is, a doubling of speed can be achieved compared to the original implementation. Again, a Java hardware accelerator solution benefits further from this approach.

In one embodiment, the invention is designed to support the Java2 Micro Edition ("J2ME") platform as applied to the Connected, Limited Device Configuration ("CLDC") product category. The J2ME/CLDC runtime environment is targeted at low-end consumer devices, which have limited memory and processor capabilities. An extension of the J2ME/CLDC environment is the mobile information device profile/protocol ("MIDP") application programming interface ("API"). This API allows applications (referred to as "MIDlets") to be downloaded into the device after it has been shipped. This enables new functionality to be added to a device without the need to add or change hardware and supports new services as they are developed. However, the capability comes at a cost, both in terms of memory footprint and power consumption. Yet, as noted, it is crucial to keep memory and processing demands of low-end devices small.

The inventor has observed that certain bytecode operations are semantically complex, and even a low dynamic frequency of these bytecodes executing at runtime can add large performance overheads, particularly if the bytecodes are not supported by suitable runtime data structures. The inventor has also observed that the typical Method only requires a small number of words on the Java stack. To achieve the objectives of low memory footprint and lessened processing demands, the invention provides a compact internal representation of classes and, in particular, of Methods. The internal representation of a Method, the fast Method access structure, is spatially optimized with special attention to Methods whose Java stack requirements fit within a standard or predefined activation frame size. This results in increased execution speeds for costly bytecodes (such as invokes and returns) while reducing memory requirements.

Among other things, the invention provides a bytecode execution system and method. The system includes a virtual machine and an interpreter or, alternatively, a hardware accelerator. It also may include a dynamic adaptive compiler. The execution speed of invokes is increased and memory requirements decreased by establishing an activation stack frame template with a set of criteria. Each Method from subject code is examined to determine whether the Method conforms to the criteria of the stack frame template. If the Method conforms, an activation frame for that Method based on the set of criteria is created. Otherwise, an activation frame based on standard virtual machine criteria is created. A fast Method access structure is spatially associated with each Method and a Method routing structure is created for each class. The Method routing structure can have misaligned pointers to indicate processor executable Method access structures and aligned pointers to indicate software-interpreted Method access structures. Invocation bytecodes are rewritten to include an indication of an entry in the Method routing structure.

Other features and advantages of the invention will become apparent to those skilled in the art upon review of the following detailed description, claims, and drawings.

DETAILED DESCRIPTION

Before any embodiments of the invention are explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," "having," and variations thereof herein is meant to encompass the items listed thereafter and equivalents thereof as well as additional items. It is assumed that the reader has familiarity with computer programming and architecture and, in particular, familiarity with Java and virtual machines. Further, as used herein the term "code" is used broadly to include, among things, both bytecode and compiled representations of bytecode.

The invention lowers the overhead costs for invokes and returns and improves the speed of Java bytecode execution using a stack frame template, a Method access structure, a Method routing structure, and certain bytecodes. While the invention is effective in achieving improved speed, these speed improvements can be counteracted if a Java program spends a lot of time within native Methods (Methods in an application specifically designed to run on a particular computing environment, such as a graphical user interface of operating system software for a specific processor), or within the operating system of the processor hosting the virtual machine.

Figure 1:
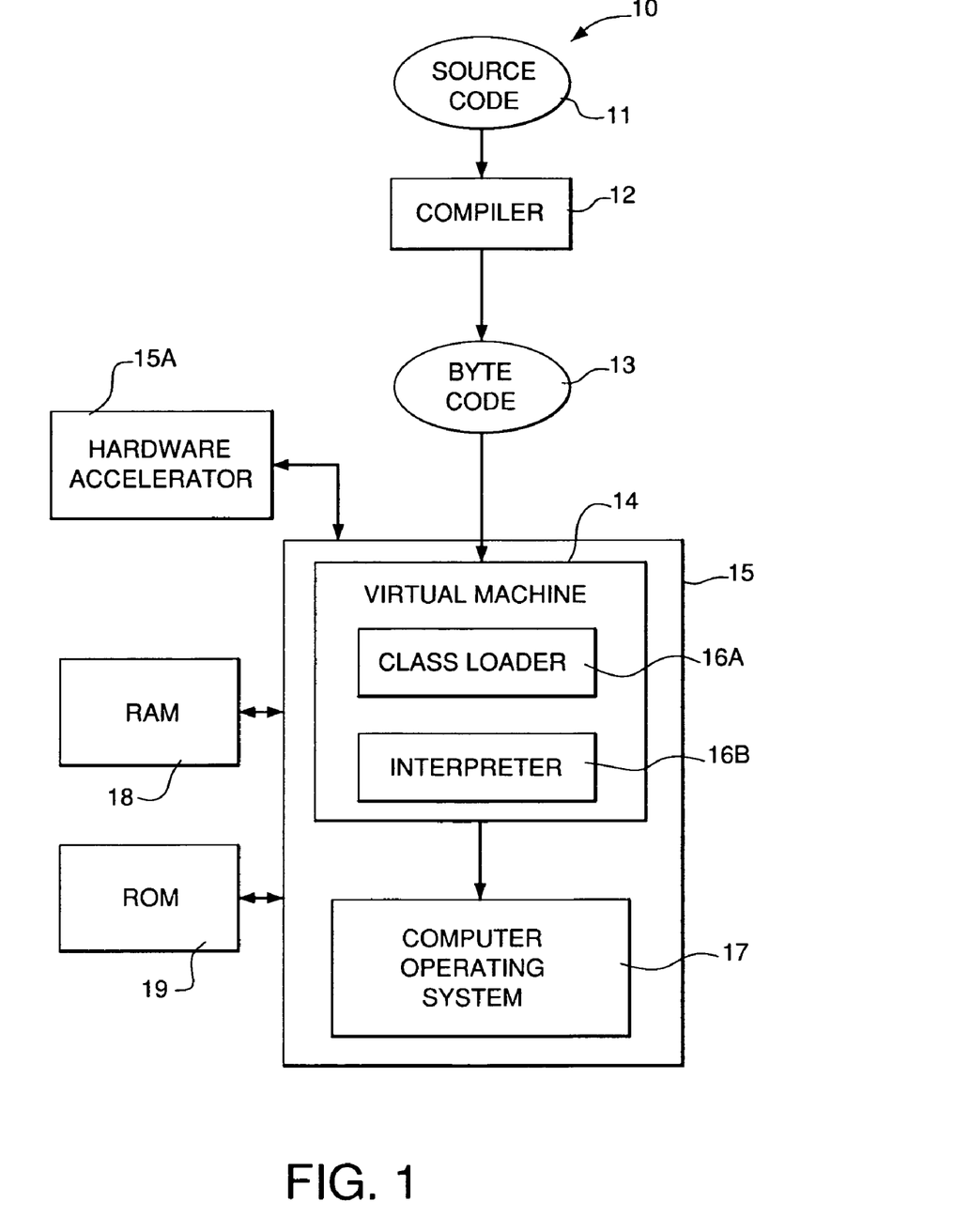
FIG. 1 is an illustration of an exemplary computing environment suitable for use with the invention.

FIG. 1 illustrates an exemplary Java computer environment 10. Source code 11 is compiled by a compiler 12 to generate bytecode 13. The bytecode 13 is provided to a virtual machine 14 resident on or executed by a hardware processing device 15, which may include a Java hardware accelerator 15A. The virtual machine contains a class loader 16A and some or all of an interpreter 16B (depending on the presence of 15A). The virtual machine interacts with the operating system software 17 of the processing device 15. The processing device interacts with RAM 18 and non-volatile memory (ROM or Flash) 19.

Figure 3:
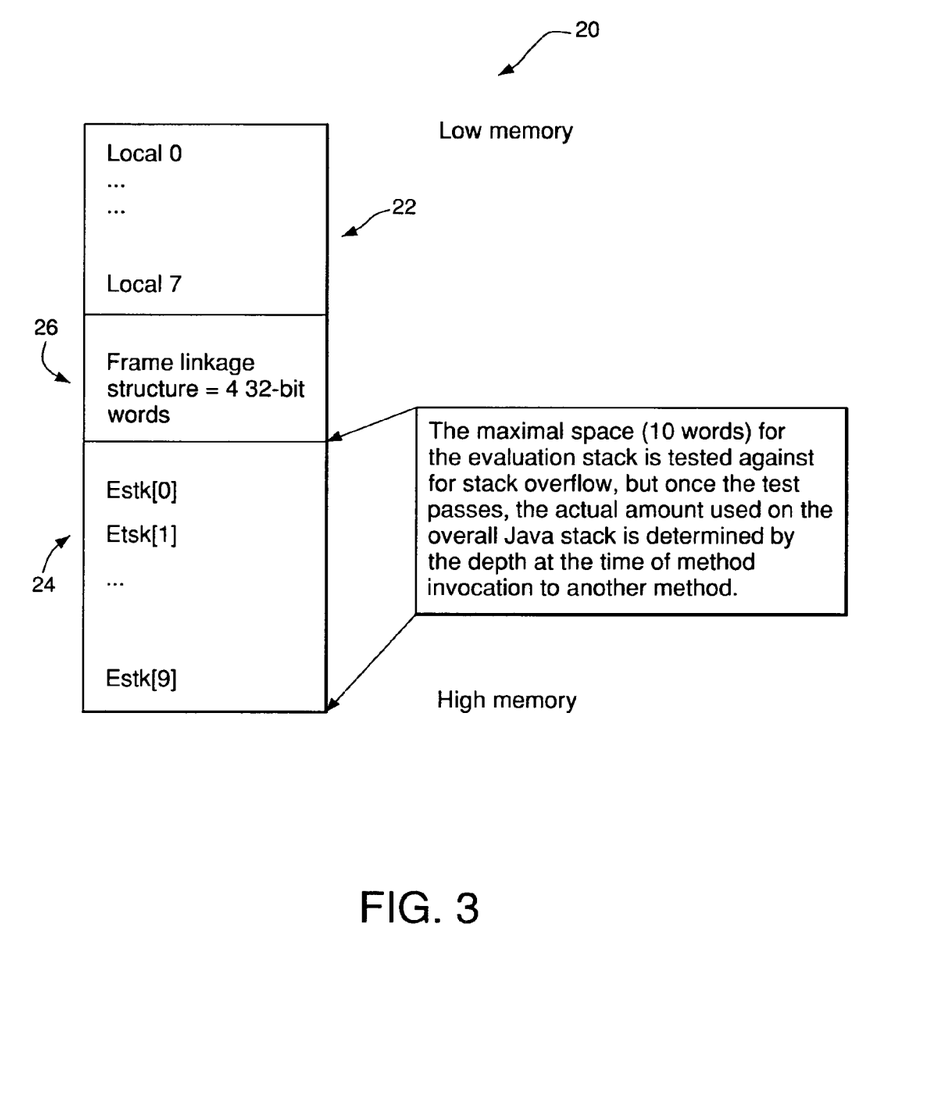
FIG. 3 is an illustration of an exemplary stack template suitable for use in the invention.

FIG. 3 illustrates a stack, or more specifically, a stack frame template 20 suitable for use in the invention. The template is based on an assumption that most Methods executing in constrained memory devices have moderate stack requirements. Following this assumption, the data of interest for most Methods only includes 1) the number of parameter words to the Method (nParamWords), 2) the total number of local words for the Method (nLocalWordsTotal), and 3) the number of words of evaluation stack (nEstkWords) used during bytecode computations. The template 20 includes a local variable portion 22 with eight words (Local0–Local7) reserved for local variable data, ten words for the evaluation stack 24, and a fixed size frame linkage structure 26 used for runtime linkage of activation frames and for state saving and restoring. The linkage structure 26 is disclosed in greater detail below.

A subject Method may execute with an activation frame conforming to the stack frame template 20 provided it meets certain criteria. In one embodiment of the invention, that criteria includes the following requirements:

nParamWords<=7,
nLocalWordsTotal<=8 (7 for synchronized Methods) and
nEstkWords<=10.

The requirements noted above are merely examples of criteria that may be used and the number of words allotted may be varied depending on the specific application of the invention at hand. Regardless of the exact values, Methods that conform to the specified criteria are so identified or otherwise designated as being conformant. This analysis can be readily performed in the class loader 16A or by a ROMising tool at system build time. When the runtime environment selects such a Method for execution, an activation frame conforming to the template 20 is created. Activation frames for non-conforming Methods are created (consistent with well-known processes) according to the requirements of the subject Method. The categorization of Methods as conforming or non-conforming reduces memory requirements. Memory savings are realized, in part, from the utilization of the conformance to standard template frames with a fast Method access structure (described in greater detail below). During any invocation, the fast Method access structure of the called Method must be determined. If a Method's stack requirements conform to the standard template 20, this access structure need only have a single-bit flag or similar marker to indicate this fact in the structure of the Method. Otherwise, three bytes of data are required to specify the stack requirements (a byte each for nParamWords, nLocalWordsTotal, and nEstkWords). The savings in memory can be substantial. For example, storing system classes in non-volatile memory requires several Kbytes less memory using the standard template single-bit flag than what would be required using known techniques.

Figure 2:
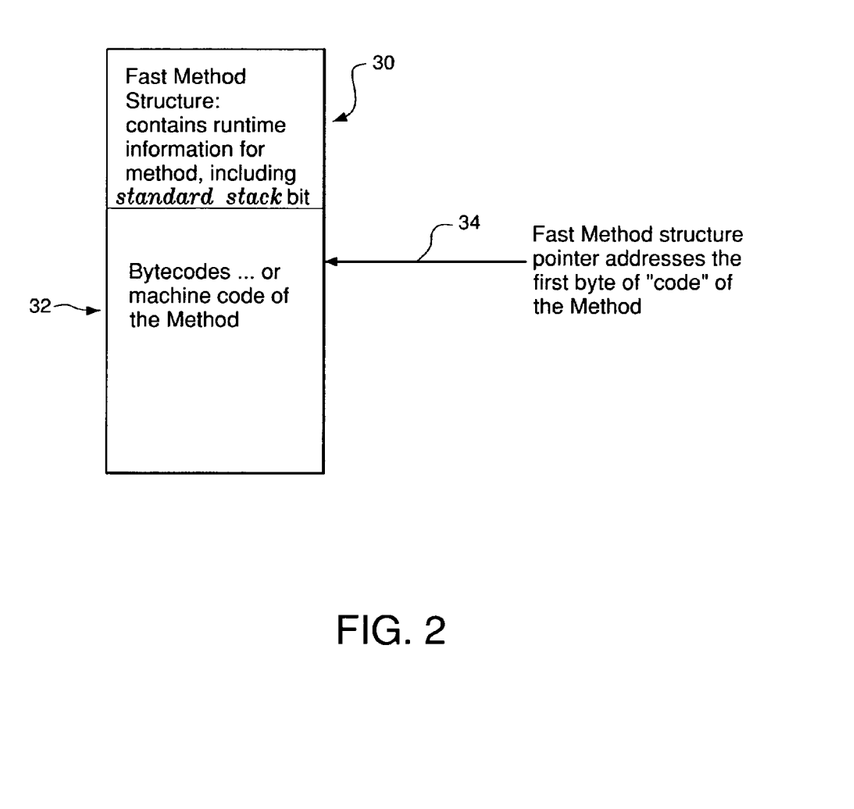
FIG. 2 is an illustration of a Method access structure spatially associated with code of a Method.

As was suggested above, various operations such as bytecode resolution, exception handling, stack frame handling, and others require knowledge of the Methods being executed. Similarly, when the runtime environment selects a Method for execution (i.e., the Method is being invoked) the structure of the destination Method must be ascertained to determine its stack requirements and whether a monitor is to be entered (e.g., if the destination Method is a synchronized Method). According to the invention, Method information is provided by a fast Method access structure ("FMAS") 30 (FIG. 2). Each access structure 30 is positioned spatially contiguous to the representation of the application Method. In a highly preferred embodiment, the Method access structure immediately precedes bytecodes 32 (if any) of the subject Method, spatially. (Some Methods such as abstract and native Methods do not have any bytecode). When compiled code is available, the position of the Method access structure remains unchanged, but the bytecodes are replaced by target code. Due to the spatial relationship, the Method access structure and representation of the Method can be viewed as a single structure.

Each Method access structure 30 is associated with a pointer 34, which in the embodiment shown is referred to as a fast Method access structure pointer ("FMASP"). According to the invention, the pointer 34 is defined as addressing the first byte of where any code would reside. This allows the same value to be used as an indicator of where any code resides for implementing the Method, and to denote the Method itself. Typically, two separate pointers are used, which requires more memory than the use of a single pointer. Thus, the invention provides a significant reduction in memory requirements. For the example of storing system classes in non-volatile memory, a further memory reduction of several Kbytes may be realized. Negative offsets off the pointer 34 are used to access items within the Method access structure.

The Method access structure 30 is a variable size structure. One reason for designing the Method access structure in this manner is that Methods vary in architecture. For example, not all Methods have exception handler tables. To accommodate the variable size aspect of the structure 30 and the fact that classes usually include several Methods, each Method access structure 30 in a specific class is linked to the next access structure within that class.

If a subject Method can execute with the standard stack template 20, then the FMAS 30 is laid out in the compact form set out in Table 1. The best case encoding only requires 32 bits of information, and may be applied when the Method has no exception handler, no need of the name and signature to be exported (however, the garbage collector still needs to know about the stack state at Method entry, so this can only be omitted if a convention is adopted on what Method signature is implied when the name and signature field is absent), and no runtime requirement of a constant pool pointer due to the nature of the bytecode or due to bytecode rewriting.

TABLE 1

Optional 32-bit pointer to exception handler table (bytecode only)
Optional 32-bit description of name and signature for the Method.
Optional 32-bit constant pool pointer
32-bit flags encoding. See Table 2.
Bytecode for the Method follows, if any . . . FMASP points here The 32-bit flags encoding noted in Table 1 is carried out according to the specifications of Table 2.

TABLE 2

| Name | Bit(s) | Semantics |
|---|---|---|
| Link | <31:17> | FMASP of next structure in chain is given by this FMASP + Link. Details of access flags such as private, protected etc. are omitted for clarity. |
| FMAS_NARGS_FLD | <8:6> | If FMAS_STDSTK is set, this field encodes the number of argument words for the subject Method (0–7) |
| FMAS_NAMESIG | <5> | If set, the name and signature field is present. |
| FMAS_STDSTK | <4> | If set, the Method's implementation can execute on a standard stack template |
| FMAS_HANDLER_ABSTRACT | <2> | <0> set <2> set => exception table pointer present. <0> clear <2> set => abstract Method; else native Method |
| FMAS_ENGINE_CPOOL | <1:0> | Method implementation with overloaded constant pool pointer bit. (Native and abstract Methods do not have a constant pool pointer) 00 Compiled. Bits <31:2> are back-pointer to bytecode |

TABLE 2-continued

| Name | Bit(s) | Semantics |
|---|---|---|
| | MSP x1 | Bytecode. Bit <1> set indicates constant pool pointer present in structure (may be NULL) |
| | 10 | Native or abstract. See bit <2> |

If the subject Method does not conform to the standard stack template 20, i.e., if FMAS_STDSTK is clear, then stack requirements for the Method are encoded using standard practices and the Method access structure 30 is laid out in the form set forth in Table 3.

TABLE 3

Optional 32-bit pointer to exception handler table (bytecode only)
Optional 32-bit description of name and signature for Method.
.bytes storage needed for non-parameter locals. (bytecode only)
.bytes storage needed for entire activation frame. (bytecode only)
.bytes storage needed for parameter locals.
Pad byte for alignment
Constant pool pointer. NULL for abstract and native.
The flags encoding word (FMAS_STDSTK clear)
Bytecode for Method follows, if any . . .

Since the set of Methods for a class are linked, an end of set marker is provided according to Table 4.

TABLE 4

The flags encoding word, set to zero
32-bit pointer to the class that these Methods are declared in If runtime compilation occurs, (for example, if no hardware accelerator is present on the device 15) then the FMAS 30 is encoded as shown in Table 5.

TABLE 5

FMASP for bytecode equivalent Method structure. Note that bits <1:0> are clear, and hence denote this as a compiled Method
Translated Method body (understands how to create frame). The FMASP value for the compiled Method points here.

Method access structures associated with dynamically compiled code are maintained in a runtime code buffer storage area, separate from any non-processor executable Method access structures (those associated with bytecode) in the system. (The code storage area can be recycled). Since compiled Methods, by definition, have all the information needed to enable their execution, there is no need for further information provided by an access structure. However, if the system supports compiled code deletion, mechanisms used to revert back to using bytecode must be supported. The back pointer to the original FMAS mentioned above supports such reversions.

The above Method access structures can be generated by a ROMising tool when building the system or dynamically, as classes are loaded. With the above structures in place, a savings of at least about 40 Kbytes may be achieved for the set of CLDC/MIDP Methods. Bytecode rewriting and other techniques can be used to achieve even greater memory savings.

Figure 4:
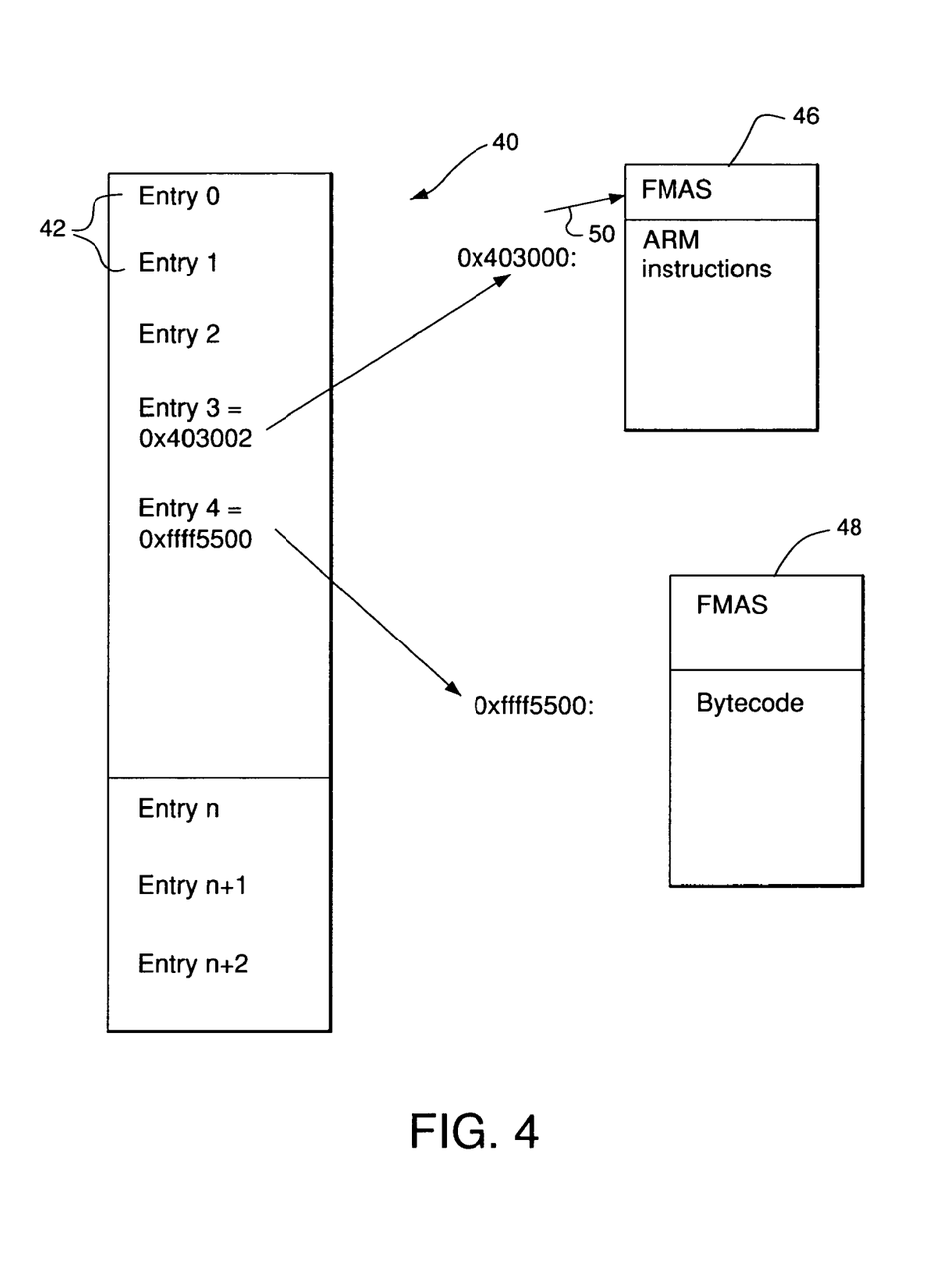
FIG. 4 is an illustration of a Method routing structure containing two Method access structure pointers.

The above aspects of the invention are not fully useful unless FMASP's can be found during runtime. Where the system includes runtime compilation, determination of the FMASP for the compiled code needs to be found quickly. In preferred embodiments of the invention, a Method routing structure ("MRS") is used to support these operations. An exemplary MRS 40 is shown in FIG. 4. The MRS 40 includes a number of entries 42, which are illustrated as Entry 0 through Entry N+2. Each entry is a pointer value to a Method access structure. In FIG. 4, two exemplary Fast Method access structures are shown, FMAS 46 and FMAS 48.

For a given class C, the FMASP's for all its Methods are grouped into one data structure, the MRS, which preferably resides in RAM 18 to allow runtime compilation the ability to update FMASP's to point at processor executable Method structures (compiled code), and code deletion to reset the FMASP's back to point at processor non-executable Method structures (bytecode) again. An MRS is partitioned into two sets of FMASP's: those that denote inheritable Methods of class C, and those that are non-inheritable.

Class C's MRS is initialized with a copy of the inheritable portion of C's superclass (unless this is java.lang.Object). Each of C's inheritable Methods (i.e., a Method that is none of the following: static, private, or a constructor) is examined. If a given inheritable Method M has the same name and signature as another Method, e.g., Method Q, whose FMASP is in the superclass's copy, and Q can be overridden according to the semantics specified by the language specification, then the FMASP for Q is replaced by the FMASP for M. Otherwise, the FMASP for M is appended to the current end of the MRS. Once all the inheritable Methods of C are processed; the non-inheritable Methods (their FMASPs) are appended to the end of C's MRS. The inheritable portion of the MRS is analogous to a well-known data structure, called a vtab or virtual function table or dispatch table.

The MRS supports both compiled and interpreted bytecode by using only one 32-bit entry per Method. In the example shown in FIG. 4, Entry 3 has a misaligned pointer value of 0x403002 for a FMAS pointer 50, which has an actual value of 0x403000. The misaligned pointer value of 0x403002 indicates that the subject Method, which as noted above follows the FMAS spatially, is directly executable by the processing device 15, with the machine code entry point at FMASP-2. The Method following the FMAS 48 is shown having bytecode. The use of misaligned pointer values enables the system to quickly pass control to compiled code, and the fact that a single 32-bit entry may be used to designate both compiled and interpreted bytecode allows the MRS to be half the size of other representations, where the system supports dynamically compiled code.

The MRS 40 is read for all styles of invokes. When an object of type C is created at runtime, it contains a pointer to the MRS for C. A pointer from the MRS back to the class C is also provided. When an invoke bytecode is resolved, the pointer P to the entry in the appropriate MRS of the declaring class is stored or otherwise noted for later use. Equivalently, the entry number N within the MRS can be derived from the pointer.

Two new bytecodes are used to take advantage of the structures noted above and also to enable removal of the original constant pool entries for these. These bytecodes are defined in Table 6 and are new forms of the invokevirtual bytecode (as defined by the Java specification).

TABLE 6

| | |
|---|---|
| Invokev_ret32 | Bc[1] = MRS entry #. Bc[2] <6:0> = #.32-bit args,<br>Bc[2]<7> = Method return type bit (1 = ref, 0 = nonref). |
| Invokev_ret64_void | Bc[1] = MRS entry #. Bc[2] <6:0> = #.32-bit args,<br>Bc[2]<7> = Method return type bit (1 = 64-bit, 0 = void). |

A resolved invokevirtual bytecode is rewritten into an Invokev_ret32 bytecode or an Invokev_ret64_void bytecode, if applicable. Each of the above bytecodes includes an indication of the Method routing structure entry, N. At runtime, for an invokevirtual bytecode, the MRS pointer is obtained from the instance or object being invoked. Then entry N from that MRS is read to get the FMASP for the destination Method. The value for N is either directly obtained from the rewritten invokevirtual bytecode, or is computed from the stored (or remembered) pointer P. (A plain invokevirtual would find the MRS pointer P to an entry in the declaring class's MRS via the invokevirtual's constant pool entry, and from this the MRS entry number N can be computed). For an invokestatic bytecode, the stored pointer P is used to obtain N.

A lot of what has been described so far relates to accessing an invoked Method. Part of the overall process of invoking a Method involves executing the actual transfer of control to the invoked or destination Method, given an FMASP. The mechanisms in the invention used to transfer control to a destination Method take advantage of the FMAS and the probability of a standard stack template being applicable to the destination Method.

Figure 5:
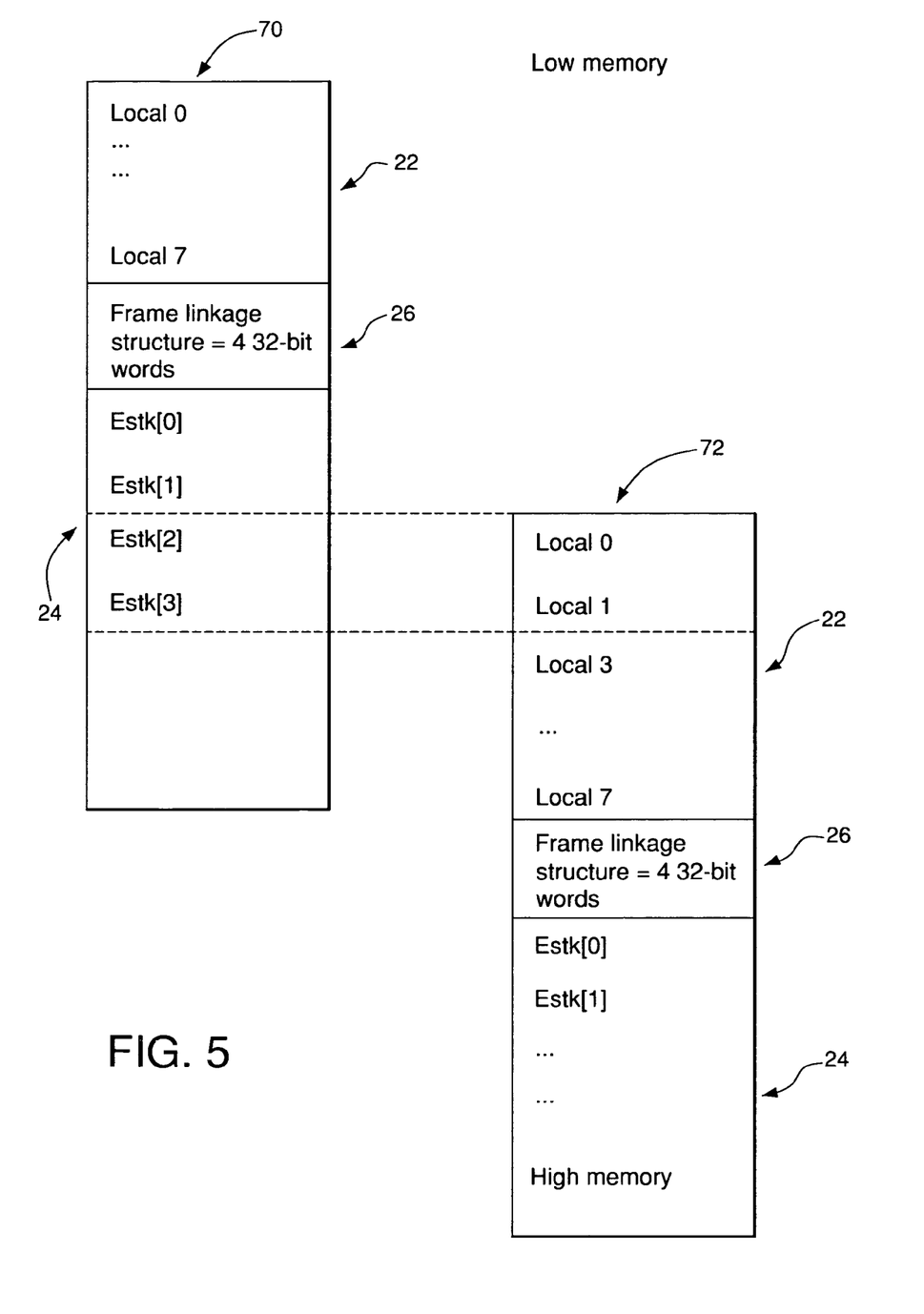
FIG. 5 is an illustration of two Methods activation frames on the Java stack formatted or configured according to the stack template shown in FIG. 2 and having an overlay between the evaluation stack of the caller Method and local variables of the callee Method.

FIG. 5 illustrates two activation frames 70 (which represents a caller Method) and 72 (which represents a callee or destination Method) configured according to the stack frame template 20. Each frame 70 and 72 includes a local variable data portion 22, an evaluation stack 24, and a frame linkage structure 26. For the example illustrated, it is assumed that there is a separate Java stack from the 'C' stack, allocated from the runtime heap. It is also assumed that activation frames and evaluation stack grow upwards, towards higher addresses. Local variables are laid out with local 0 at the lowest address. The local variables of the activation frame 72 overlay evaluation stack entries of the activation frame 70.

The frame linkage structure 26 within each activation frame is used to store state information about the caller. The state information may include the following items:

prevMethod, which identifies the caller's Method (i.e., its FMASP)

prevLocals, which is the caller's local 0 pointer prevBcode, which is the bytecode continuation address within the caller returnAddr, which is a native return address that receives control on return from the callee. If the initiating invoke originated in the interpreter, then this return address points back into the interpreter.

As noted, if a subject Method can execute within the standard stack template 20, then the activation frame for that Method is laid out according to the template 20.

As part of the control transfer process, the runtime environment must check that the activation frame required for the callee can be satisfied from the current stack region, and take suitable action if the stack overflows. To simplify this check, a stack limit value is stored. The stack limit value is equal to the size of the applicable Java stack limit minus the size of a standard stack frame. As noted above, the size of the standard frame template may vary depending on the specific application at hand.

Another part of the control transfer process involves manipulating register states. In general, register states are available in processor registers and, for preferred embodiments of the invention, it is assumed the following values are available in processor registers:

locals, the pointer to local0 in the current activation frame, which is saved and restored across an invoke estk, the Java evaluation stack pointer. Points at the last used word on the stack, rather than the next free word. Preferably, the runtime environment is arranged to leave this pointing at the first parameter, not the last, at an invoke.

currMeth, the FMASP for the current Method currBc, for interpreted callers, this is the continuation bytecode address.

jstackLimit, the Java stack limit as described above calleeMeth, the FMASP for the destination of an invoke, which becomes the currMeth of the callee.

Preferably, the order of the registers and frame linkage structures 26 are matched so that efficient frame management may be realized. This is particularly important for those implementations where the device 15 is implemented with a reduced instruction set computer ("RISC") processor used to directly execute the virtual machine along side existing operating system, middleware, and application code. An ARM™ CPU is an example of such a processor. When such a processor is used, matching the order of registers and frame linkage structure elements allows the use of the LDM/STM instructions.

Having defined the overall process of invoking and returning from Methods more detailed examples are now provided. First, an invoke is described. Second, a return is described.

The initial part of an invoke involves fetching the FMASP for the destination Method into the register "calleeMeth". The exact nature of this step depends upon the kind of invoke bytecode being executed. For an invokev_ret32, assuming currBc has been updated to point after the invoke, the number of parameter words may be fetched from currBcode-1, bits <6:0>, and the MRS entry number may be obtained from currBcode-2. The code sequence set out below demonstrates the interpreter executing both the invoke and the destination Method, taking advantage of the FMASP and the standard stack template. For the example shown, it is assumed that register "mrsEntry" holds the MRS entry number extracted from the bytecode.

| | |
|---|---|
| sub estk, estk, #((nParamWords-1) * 4) | // address first argument |
| ldr tmp, [estk] | // fetch "this" for callee |
| ldr tmp, [tmp. # − 4] | // fetch pointer to MRS of class of dest. |
| ldr calleeMeth, [tmp, mrsEntry, LSL #2] | // fetch FMASP for dest.Method |
| ldr link, [pc, = resumeAfterInvokeRet32] | // for post-Java return processing |
| tst calleeMeth, METH_IS_COMPILED<br>sub.ne pc, calleeMeth, METH_IS_COMPILED | // test for misaligned pointer<br>// and branch to dest, possibly |
| ldr tmp, [calleeMeth-4] | // fetch flags encoding word in FMAS |
| tst tmp, FMAS_STDSTK | // test for standard stack template |

-continued

```
beq NonStdStack              // handle non-standard
                             size . . .
cmp estk, jstackLimit        // stack overflow ??
bge overflow                 // handle overflow . . .
add estk, estk, #((8 - 1) * 4)  // point to local7 (just before
                             linkage)
stmib estk!, {link, currBc, locals,  // create frame linkage
currMeth}                    structure
                             // estk points at callee's
                             estk[-1].
                             // I.e., empty
sub locals, estk, #((8 - 1 + 4) * 4)  // point at local0 for callee
mov currMeth, calleeMeth     // update current Method
mov currBc, currMeth         // and point at its first
                             bytecode
b INTERP_loop                // and start executing Method
```

The initial step in a return operation involves fetching the return value. The code sequence below demonstrates this and the remaining steps carried out in a return. For this example, it is assumed that a 32-bit value is returned, that the return address is to the label resumeAfterInvoke32, and that the return value will be in register retVal.

```
mov retVal, [estk]           // fetch return value
ldr tmp, [currMeth-4]        // fetch flags encoding word in FMAS
tst tmp, FMAS_STDSTK         // test for standard stack template
beq NonStdStackRet32         // handle non-standard size . . .
add tmp, locals, #((8 + 4) * 4)  // point to return address
mov estk, locals             // set up estk for caller
ldmdb tmp, {pc, currBc, locals,  // and return
currMeth}
```

In this example, the caller has to push the return value back onto the caller's own evaluation stack (if the callee tried this in the sequence above, and the Method had no arguments, then the write back would corrupt the first word of the frame linkage structure).

As can be seen from the above, the invention provides new data structures and bytecodes to improve the speed of invokes and returns while minimizing the memory footprint required to support this. Various features and advantages of the invention are set forth in the following claims.

What is claimed is:

1. A method of increasing the execution speed of invoking and returning from a Method of a plurality of Methods executing on a computer system while reducing the supporting memory footprint, the method comprising:
    establishing a single frame size determining template for comparing the single frame size determining template with each of the Methods of the plurality of Methods, the single frame size determining template having a set of frame size determining criteria representative of a predetermined number of words for determining the size of activation frames when creating the activation frames;
    determining whether a word number requirement of the Method conforms to the frame size determining criteria of the single frame size determining template;
    conditionally creating a fixed size activation frame regardless of an exact stack requirement of the Method, based on the set of frame size determining criteria of the single frame size determining template if the word number requirement of the Method conforms to the set of frame size determining criteria of the single frame size determining template;
    conditionally creating an activation frame to match the Method's exact stack requirements if the word number requirement of the Method does not conform to the set of frame size determining criteria of the single frame size determining template;
    spatially optimizing the Method to provide a Method access structure; and
    associating the Method access structure with the Method such that the Method access structure is contiguous with the code of the Method.

2. The method as claimed in claim 1, wherein the set of frame size determining criteria includes the number of parameter words, the total number of local words, and the number or words of evaluation stack.

3. The method as claimed in claim 1, wherein creating an activation frame for the Method based on the set of frame size determining criteria of the single frame frame size determining template includes creating a local variable portion, an evaluation stack, and a fixed size frame linkage structure.

4. The method as claimed in claim 1, further comprising associating the Method access structure with a pointer and defining the pointer such that it is an indicator of where code for implementing a Method resides and an indicator for the Method itself.

5. The method as claimed in claim 1, wherein the Method access structure is variably sized.

6. A computer-implemented method of increasing the execution speed of invoking a plurality of Methods in an execution device, the plurality of Methods associated with one or more classes, the method comprising:
    establishing a single frame size determining template for comparing the single frame size determining template with each of the Methods of the plurality of Methods when they are invoked, the single frame size determining template having a set of frame size determining criteria representative of a predetermined number of words for determining the size of activation frames when creating the activation frames;
    for each one of the Methods,
    determining whether a word number requirement of the one Method conforms to the frame size determining criteria of the single frame size determining template;
    conditionally creating a fixed size activation frame regardless of an exact stack requirement of the one Method, based on the set of frame size determining criteria of the single frame size determining template if the word number requirement of the one Method conforms to the set of frame size determining criteria of the single frame size determining template;
    conditionally creating an activation frame to match the one Method's exact stack requirements if the word number requirement of the one Method does not conform to the set of frame size determining criteria of the single frame size determining template;
    spatially optimizing the Method to provide a Method access structure;
    associating the Method access structure with the Method such that the Method access structure is contiguous with the code of the Method;
    conditionally creating a Method routing structure external to the Method access structure and pointing to the Method access structure for each class; and rewriting invocation bytecodes to a form that includes an indication of the Method routing structure.

7. The method as claimed in claim 6, wherein the set of frame size determining criteria includes the number of parameter words, the total number of local words, and the number or words of evaluation stack.

8. The method as claimed in claim 6, wherein creating an activation frame for the Method based on the set of frame size determining criteria of the single frame size determining template includes creating a local variable portion, an evaluation stack, and a fixed size frame linkage structure.

9. The method as claimed in claim 6, further comprising associating each Method access structure with a pointer and defining the pointer such that it is an indicator of where code for implementing a Method resides and an indicator for the Method itself.

10. The method as claimed in claim 6, further comprising maintaining Method access structures associated with dynamically compiled code in an area of memory separate from Method access structures associated with bytecode.

11. The method as claimed in claim 6, further comprising creating the Method routing structure such that it has one or more misaligned pointers.

12. The method as claimed in claim 11, wherein the misaligned pointers are used to denote processor executable Method access structures and one or more aligned pointers are used to denote processor non-executable Method access structures.

13. The method as claimed in claim 6, wherein each Method access structure is variably sized.

14. An execution system for increasing an execution speed of invoking Methods of one or more classes, the system comprising:
   memory; and
   a virtual machine operable to access the memory, to create a representation of at least one of the Methods based on a single frame size determining template for comparing the single frame size determining template with each of the Methods of the plurality of Methods when they are invoked, the single frame size determining template having a set of frame size determining criteria representative of a predetermined number of words for determining the size of activation frames when creating the activation frames, to conditionally create a representation of at least one of the Methods based on exact stack requirements, to spatially optimize at least one of the Methods to provide a Method access structure, to associate the Method access structure contiguous to the representation of each of the Methods, to create a Method routing structure external to the Method access structure and pointing to the Method access structure for each of the one or more classes in the memory, and to rewrite invocation bytecodes to a form that includes an indication of the Method routing structure.

15. The execution system as claimed in claim 14, wherein the set of frame size determining criteria includes the number of parameter words, the total number of local words, and the number or words of evaluation stack.

16. The execution system as claimed in claim 14, wherein the single frame size determining template includes a local variable portion, an evaluation stack, and a fixed size frame linkage structure.

17. The execution system as claimed in claim 14, wherein the virtual machine is operable to associate a pointer with each Method access structure, the pointer defined such that it is an indicator of where code for implementing a Method resides and an indicator for the Method itself.

18. The execution system as claimed in claim 14, wherein the virtual machine is operable to maintain Method access structures associated with dynamically compiled code in an area of memory separate from Method access structures associated with bytecode.

19. The execution system as claimed in claim 14, wherein the Method routing structure includes one or more misaligned pointers to denote processor executable Method access structures.

20. The execution system as claimed in claim 14, wherein the virtual machine is operable to spatially associate the Method access structure immediately preceding the representation of each of the Methods.

* * * * *